United States Patent [19]

Froeschke

[11] Patent Number: 4,623,307

[45] Date of Patent: Nov. 18, 1986

[54] DEVICE FOR EXTRUDING FLOWABLE SUBSTANCES

[75] Inventor: Reinhard Froeschke, Weinstadt, Fed. Rep. of Germany

[73] Assignee: Santrade Ltd., Lucerne, Switzerland

[21] Appl. No.: 650,701

[22] Filed: Sep. 14, 1984

[30] Foreign Application Priority Data

Nov. 2, 1983 [CA] Canada ................................... 440256

[51] Int. Cl.$^4$ ............................................ B29C 67/02
[52] U.S. Cl. ........................................ 425/8; 264/8;
264/118; 249/102; 425/198; 425/182; 425/190;
425/294; 425/374; 425/376 B; 425/463;
425/464; 425/467
[58] Field of Search ........................ 425/6, 8, 132, 185,
425/198, 294, 374, 376 A, 376 B, 447, 463, 464,
467, 182, 376 R, 310, 183, 311, 184, 190; 264/8,
13, 118, 140, 141, 202; 249/102, 103, 104, 112

[56] References Cited

U.S. PATENT DOCUMENTS 642,813 2/1900 Cowen ............................ 425/376 A
4,202,522 5/1980 Hanas et al. ........................ 425/185
4,279,579 7/1981 Froeschke ............................... 425/6

FOREIGN PATENT DOCUMENTS 12192 1/1983 European Pat. Off. .

Primary Examiner—Jay H. Woo
Assistant Examiner—Timothy W. Heitbrink
Attorney, Agent, or Firm—Burns, Doane, Swecker & Mathis

[57] ABSTRACT

A flowable substance is extruded from two coaxial telescoping cylindrical containers of which the outer is provided with openings on its periphery and is rotatable about the inner container. The substance is fed to the inner container and exits via a row of openings therein. As the outer container rotates, the inner and outer openings radially coincide cyclically whereby the substance falls in the form of drops onto a belt and solidifies. The row of openings of the inner container is provided in a nozzle bar which is removably attached to the periphery of a body part of the inner container.

9 Claims, 11 Drawing Figures

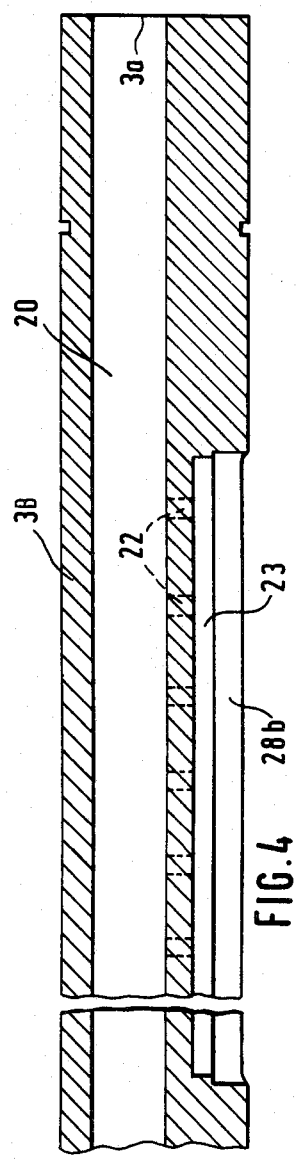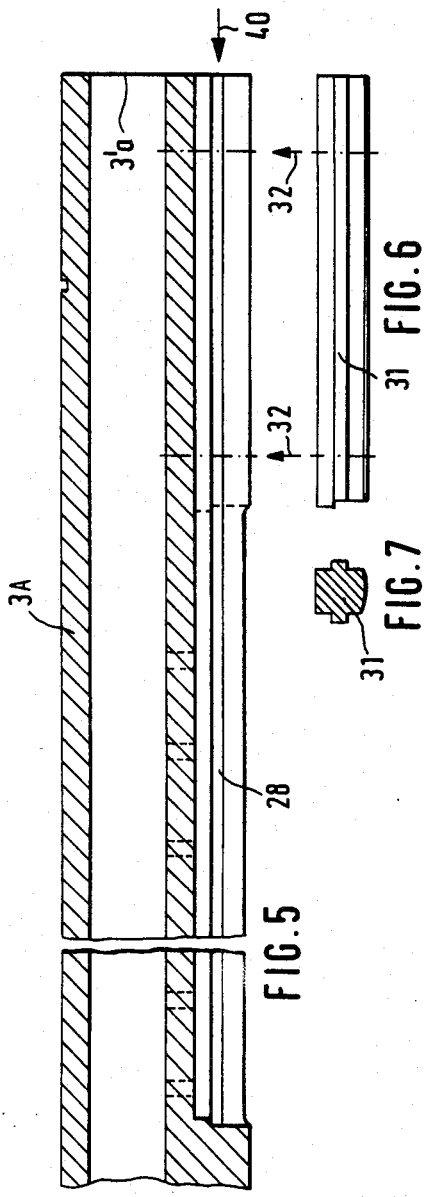

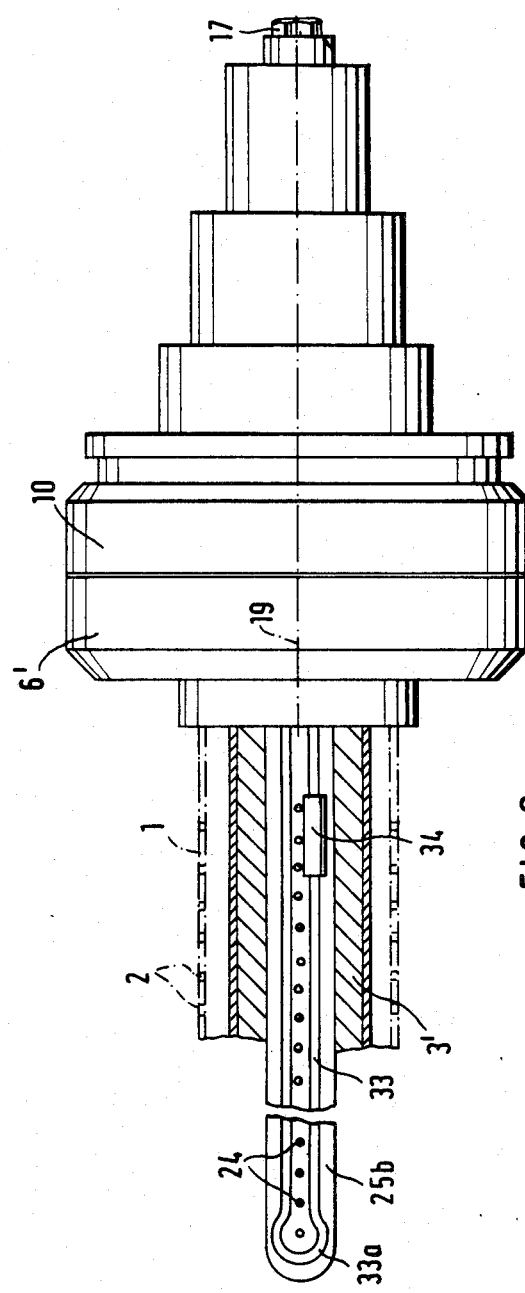

DEVICE FOR EXTRUDING FLOWABLE SUBSTANCES

BACKGROUND AND OBJECTS OF THE INVENTION

The invention concerns a device in which a flowable substance is extruded from two cylindrical containers and solidifies on a conveyor belt therebelow. In such devices an outer one of the containers is provided with openings on its periphery and is rotatable about the outer wall of the inner container disposed within the outer container and to which the substance to be extruded is axially fed. A row of openings in the inner container coincides cyclically with openings of the outer container during relative rotation between the containers, whereby the substance falls in drop form onto a conveyor or cooling belt, which is arranged therebelow. The drops thereafter solidify or gelatinize.

Devices of this type are known (EP-PS No. 12 192) wherein a row of openings, provided in the stationary inner container have specific, unvariable dimensions, so that it becomes necessary in each case for dropping various substances to always select a temperature and viscosity so that the dropping takes place in a desired manner. The use of known extrusion devices of the previously noted type is somewhat limited because the temperature cannot always be set with all substances in such a way that the desired viscosity is attained, and which still yields the desired drop-shape with the given opening dimensions.

It is, therefore, an object of the invention to enable such devices to vary the drop characteristics without having to vary the temperature and/or viscosity.

SUMMARY OF THE INVENTION

In accordance with the invention, the row of openings in the inner container are provided in a nozzle bar which can be removably attached to a body part of the inner container. This design has the advantage that various nozzle bars can be provided whose form is different in each case and suitable for various types of applications. The adapability to various materials is thus increased without the cost of such a rotor drop shaper becoming too great.

Preferably, the nozzle bar is formed straight and disposed parallel to the axis of rotation. Most preferably, the nozzle bar is inserted into a groove on the body part of the inner container.

It is preferable in certain cases of application for the groove to have parallel walls, so that the bar is inserted in a radial direction and is held in place by the outer cylinder which surrounds the inner container. The nozzle bar is pressed, with this design, under the pressure of the substance to be extruded, against the outer container and in this way gives a tight and good guide as well as a sufficient stripping effect. This embodiment is particularly suitable for low-viscous substances, with which the extrusion pressure can still be maintained relatively low, so that the contact pressure of the nozzle bar against the rotating cylinder, which is located on the outside, cannot lead to an increased wear, not to mention a deformation of the outer cylinder.

For use with high-viscous substances, on the other hand, a construction has proven itself advantageous wherein the nozzle bar is axially inserted, in a form-locking manner, into a guide on the inner container. This groove, which serves to guide the nozzle bar, can, for example, have a T-shaped cross-section to which the outer shape of the nozzle bar is adapted. With this embodiment, the considerably higher pressure, which is used for extruding the high-viscous substances, and the forces exerted thereby on the nozzle bar are absorbed by the inner container. The nozzle bar is, therefore, not pressed with too great a force against the inner wall of the outer cylindrical container, so that the operability is not adversely affected.

In order to attain a fine-tuning of the viscosity of the substances to be extruded, it is, moreover, advantageous if the nozzle bar itself is heated or cooled, so that, in addition to the temperature regulating device already present in the inner container for the substance to be extruded, a temperature regulating device is provided in the nozzle bar in the area in which the substance is pressed outward through relatively small openings. For this purpose, the nozzle bar can have a heating or cooling coil which is laid on both sides of the row of openings, so that a very sensitive temperature control is possible as this additional heating or cooling coil is regulated in its temperature. In this way, the substance to be extruded can still be exactly tempered until shortly before its discharge, so that excellent dropping results can be achieved with this new embodiment.

In order to attach the nozzle bar to the inner container, it is advantageous for the outer container to be removable axially from the inner container. This can be attained by a suitable support structure on the side opposite the rotating drive.

THE DRAWING

Additional features and advantages of the invention are shown in the embodiments of the invention, which are explained in the following description and illustrated with reference to the drawings, showing:

FIG. 4 is a longitudinal sectional view taken through the inner container of FIG. 3 configured to receive the nozzle bar of FIG. 3a;

FIG. 5 is a longitudinal sectional view taken through the inner container of FIG. 2 configured to receive the nozzle bar of FIG. 2a;

FIG. 6 depicts a retainer which can be radially inserted into the inner container of FIG. 5;

FIG. 7 is a cross-sectional view taken through the retainer of FIG. 6;

FIG. 9 is a sectional view similar to FIG. 8 but depicting the apparatus from above.

DETAILED DESCRIPTION OF PREFERRED EMBODIMENTS OF THE INVENTION

Figure 1:
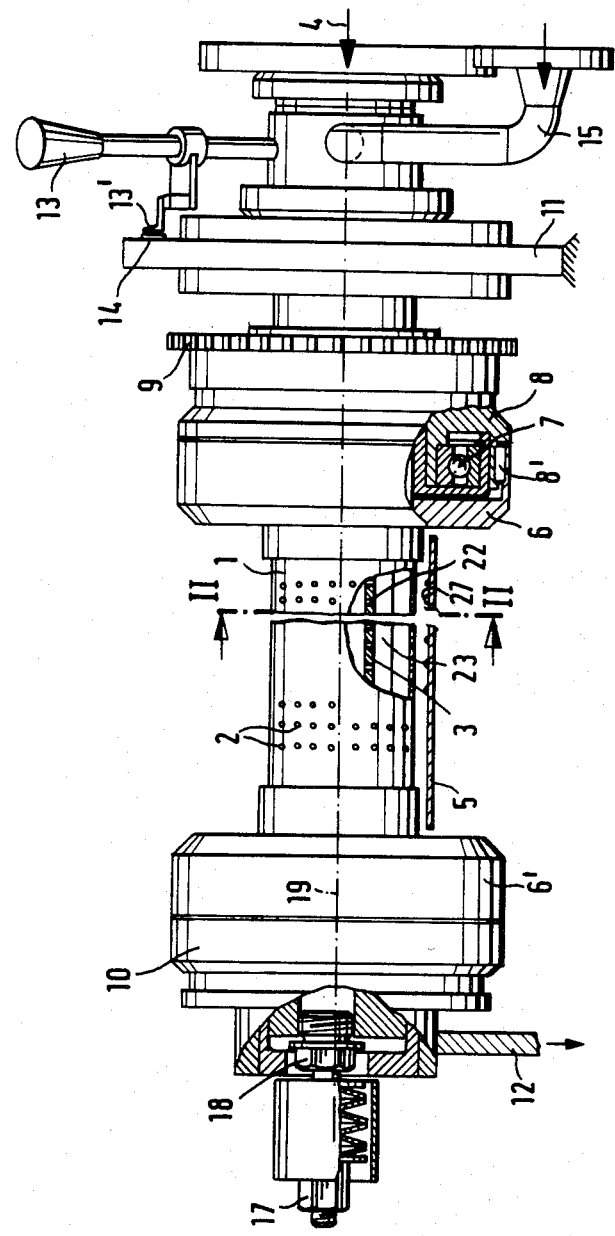
FIG. 1 is a schematic side elevational view of a rotor drop shaper, for extruding flowable substances.

FIG. 1 schematically illustrates a so-called rotor drop shaper for dropping flowable substances. The shaper comprises an outer tubular cylindrical container 1 provided with openings 2 on its periphery, and an inner container 3, which is disposed inside the outer container 1. The substance to be dropped is axially fed into the inner container 3 in the direction of the arrow 4 and is radially pressed out through a row of downwardly directed openings 24, which will be described in detail later. The inner openings 24 coincide cyclically with the outer openings 2 as the outer container 1 turns relative to the inner container 3. Below the two relatively rotating cylindrical containers 1 and 3, a conveyor in the form of a cooling belt 5 is provided which runs perpendicularly to the paper in the representation of FIG. 1 and which is guided by guide devices (not shown) below the two containers 1 and 3. In the illustration of FIG. 1, both the width of the cooling belt 5 and the axial length of the two cylindrical containers 1 and 3 are shown shortened; the width of the belt 5 and the corresponding length of the containers 1 and 3 can be chosen according to type of use and desired production. With most rotor drop shapers, this dimension is approximately one meter.

The outer cylindrical container 1 is connected at both its ends to flanges 6, 6' such that relative rotation therebetween is prevented. The flange 6 is rotatably supported by a bearing 7, and is connected by means of an adjusting wedge 8' or the like, with a driving part 8 such that the driving part 8 can rotate the flange 6. The driving part 8 is rigidly connected to a gear wheel 9, driven by any suitable drive (not shown). The flange 6' is rotatably supported in a bearing part 10. The above-described structure is carried by fixed base plates 11, 12 so that the rotor drop shaper maintains a defined position above the belt 5. The height of the containers 1, 3 from the belt 5 can be adjusted by means of an eccentric which is actuated by a lever 13 in a manner similar to that disclosed in my U.S. Pat. No. 4,279,579 issued July 21, 1981. The set position can be read by way of an indicator 13', firmly connected with lever 13, on a scale 14 which is fixedly mounted on the base plate 11.

The substance is fed to the interior of the inner container 3 in direction of the arrow 4. A heating medium is fed through a conduit 15; the heating medium can be carried off by a connection, which is not shown, on the other side. The heating medium is described in greater detail in the following.

For reasons to be explained later, the outer container 1 can be axially removed from the inner container 3. This is accomplished by unscrewing clamping bolts 17, 18, which are provided at a front end of the apparatus, so that the entire bearing part, comprising the bearing part 10 and the flange 6', can be removed toward the left along the outer container 1 in the axial direction.

Figure 2:
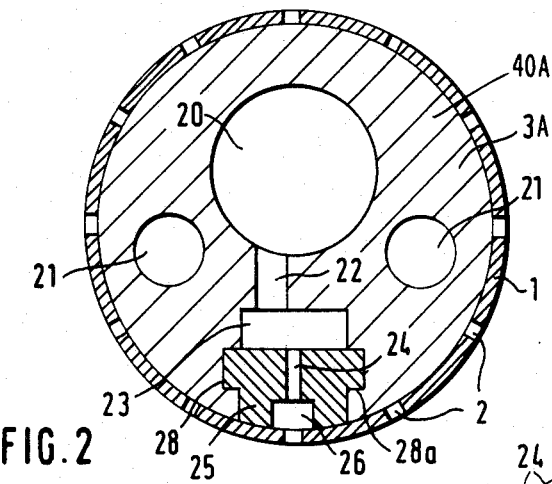
FIG. 2 is a cross-sectional view taken along line II—II of FIG. 1 depicting a first embodiment of a nozzle bar used for dropping high-viscous substances.
Figure 3:
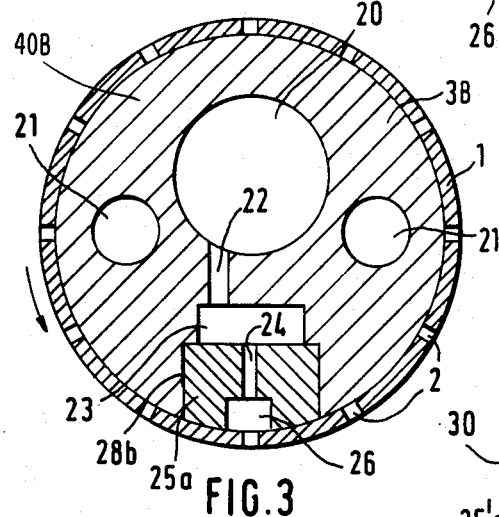
FIG. 3 is a cross-section similar to FIG. 2 but depicting a second embodiment of the nozzle body used for dropping low-viscous substances.

The inner structure of the dropper becomes clear from FIGS. 2 and 3 which depict two slightly different embodiments 3A, 3B of the inner container. The inner container 3A or 3B includes a body 40A or 40B provided with an axially extending feed bore 20 for conducting the material to be extruded and into which bore the material is fed in the direction of the arrow 4 of FIG. 1. This occurs under pressure. The body 40A or 40B of inner container 3A or 3B is, moreover, also provided with two ducts 21, extending parallel to the bore 20, which conduct the heating medium, preferably thermal oil, supplied through the conduit 15. This heating medium is temperature-controlled by a suitable control device, situated on the outside. The substance to be extruded travels, by way of several bores 22, into a duct 23, which extends parallel to the axis 19, and which is always open to the outside and is closed by the outer container 1. From this duct 23, the tempered material, which is under pressure, travels through the row of openings 24 and enters a nozzle bar 25 which is mounted in the body 40A of the inner container 3A. The material then travels into a downwardly open groove 26 of the nozzle bar 25. As the outer container 1 rotates, the openings 24 and their common groove 26 coincide cyclically with the openings 2, so that the material, which is still under a certain pressure in the groove 26, is pushed out through the openings 2 and falls in the form of drops 27 (FIG. 1) upon the belt 5. These drops subsequently solidify or gelatinize and can then be further processed.

Figure 2A:
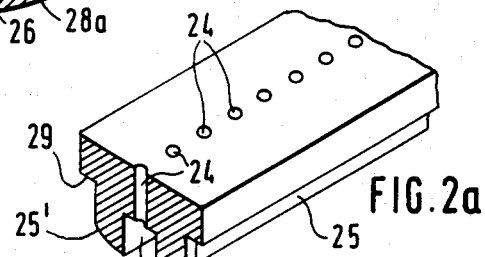
FIG. 2a is a perspective partial illustration of the nozzle bar of FIG. 2.

The inner container depicted in FIGS. 2, 2a is designed for dropping high-viscous substances. In that regard, the duct 23 opens into a longitudinal groove 28 having a T-shaped cross-section. The cross-section of the nozzle bar 25 is correspondingly T-shaped. With the outer container 1 removed, the nozzle bar 25 is axially inserted into the T-shaped groove 28. The device can be used after reinstalling the outer container 1. Advantageously, the nozzle bar 25 is supported by its T-shaped form which defines oppositely extending stops 29 that engage stops 28a of the groove 28.

The extruding pressure used when dropping high-viscous substances, and the thereby resulting forces on the nozzle bar 25, are thus resisted by the inner container 3A. As a result, deformation-producing forces are not exerted on the outer container 1.

The dimensions of the nozzle bar 25 are, of course, chosen in such a way that the nozzle bar fills the cross-section formed by the groove 28. The nozzle bar 25 is, for this purpose, also made slighly spherical at its underside 25', with a radius which is in accordance with the diameter of the inner wall of the outer container 1.

Figure 3A:
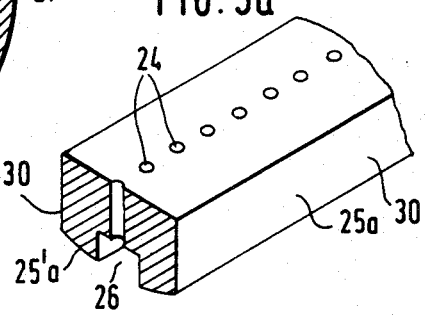
FIG. 3a is a perspective partial illustration of the nozzle bar of FIG. 3.

The inner container 3B depicted in FIGS. 3, 3a is designed for extruding low-viscous substances. Here, the nozzle bar 25a has two parallel side walls 30 which oppose corresponding parallel walls of the groove 28b of the inner container 3B. Hence, the nozzle bar 25a is pressed against the inner side of the outer container 1 by the pressure of the material to be extruded, so that a very good sealing effect results between the nozzle bar 25a (whose underside 25a' is spherical) and the outer container 1. With the extrusion of low-viscous substances, the pressures to be used are not so high that deformation of the outer container 1 will occur.

Depending upon the use of nozzle bar 25 or 25a, the inner containers 3A or 3B are assembled differently. FIG. 4 shows the inner container 3B of FIG. 3, wherein the nozzle bar 25a is to be radially inserted from the outside into the groove 28a. By mounting the outer container 1, the nozzle bar 25a is secured in the inner container 3.

With the inner container 3A of FIG. 5, the groove 28 extends axially up to one (right-hand) end 3' of the inner container 3A. The front end 3'a of the inner container 3A and the front end 3a of the inner container 3B shown in FIGS. 4, 5 are oriented reversely as compared to FIG. 1. The front ends 3a, 3'a always face toward the two female screws 17 and 18 after the apparatus has been assembled. The insertion of the nozzle bar 25 of FIG. 2a also takes place from this side.

Consequently, the nozzle bar 25 is inserted parallel to the axis in the direction of an arrow 40 in FIG. 5. After insertion, the bar 25 is secured in position by means of a retainer 31 which is installed in the direction of arrows 32 and then secured by screws inserted along the arrows 32.

Figure 8:
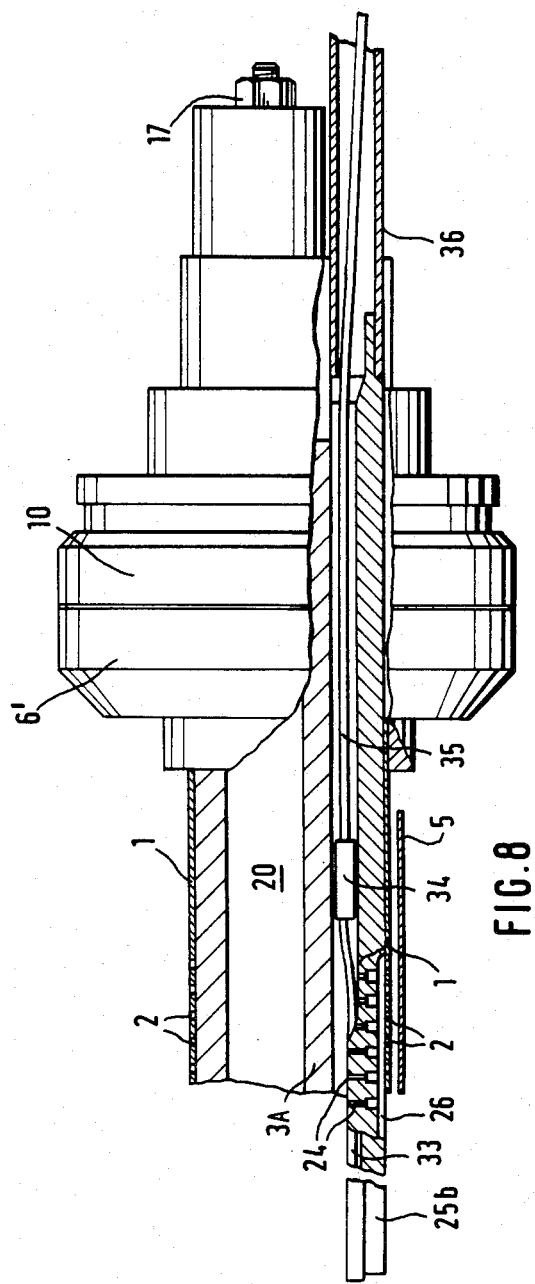
FIG. 8 is a partial longitudinal sectional side view through a rotor drop shaper similar to FIG. 1, however, depicting an inserted nozzle bar having a temperature regulating wire attached thereto.

In FIGS. 8 and 9 there is depicted a nozzle bar 25b which, similarly to the afore-described nozzle bar 25, has a T-shaped cross-section and is inserted axially in a corresponding groove 28 in the inner container 3A. However, nozzle bar 25b has an electric heating coil 33, which is disposed adjacent both sides of the row of openings 24 in the area of the upper side of nozzle bar 25b. The coil 33 is provided, by means of a connecting piece 34, with connecting pipes 35, which are led outwardly through a pipe 36 to a control mechanism (not shown) for monitoring and controlling the temperature in the area of the nozzle bar 25b. The connecting piece 34 can also contain suitable thermometer probes. The heating coil 33 has portions laid equidistantly on both sides of the openings 24 and which unite at one end to form a bend 33a. This design enables a very sensitive temperature control to be imposed upon the material directly in the area of the row of openings 24. The nozzle bar 25b can be axially removed from the inner container 3A and, if necessary, replaced. As a result of the temperature influences, which are thus made possible right up to the discharge of the drops, a trouble-free operation can be maintained in the use of flowable materials whose viscosity is very temperature dependent.

As a result of the afore-described structure, different nozzle bars can be installed which have differently sized or arranged openings 24, etc., whereby it is not necessary to vary the temperature and/or viscosity to change the dropping characteristics.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. Apparatus for extruding a flowable material in drop form onto a surface disposed therebeneath, said apparatus comprising an outer cylindrical container having first openings therethrough, said outer cylindrical container having an inner surface, an inner container disposed within said inner surface of said outer cylindrical container, said inner container including a cylindrical body and a nozzle bar replaceably attached to said cylindrical body, said nozzle bar containing second openings to which said flowable material is fed and conducted outwardly, said second openings configured in accordance with the flow characteristics of that material to achieve a particular drop configuration, and means for effecting relative rotation between said inner and outer containers about an axis of rotation to bring said first and second openings cyclically into alignment over the surface whereupon the flowable material falls from said aligned openings and onto the surface in the form of drops, said nozzle bar oriented parallel to said axis of rotation and including a radially outer periphery curved correspondingly to said inner surface.

2. Apparatus according to claim 1, wherein said cylindrical body includes means for receiving said nozzle bar such that said nozzle bar is oriented parallel to said axis, said receiving means comprising a longitudinal groove in said cylindrical body, said nozzle bar having an outer periphery disposed opposite to, and configured correspondingly to, an inner wall of said outer container, said groove includes parallel walls and is arranged to receive said nozzle bar in a radial direction, said nozzle bar being secured in said groove by said outer container.

3. Apparatus according to claim 1, wherein said cylindrical body includes means for receiving said nozzle bar such that said nozzle bar is oriented parallel to said axis, said receiving means comprising a longitudinal groove in said cylindrical body, said nozzle bar having an outer periphery disposed opposite to, and configured correspondingly to, an inner wall of said outer container, said groove is open at one end of said cylindrical body to receive said nozzle bar in a direction parallel to said axis, said groove having a portion of reduced cross-section, said nozzle bar being correspondingly configured and being secured against radial withdrawal from said cylindrical body by said portion of reduced cross-section.

4. Apparatus according to claim 3, wherein said groove and nozzle bar are each of T-shaped configuration.

5. Apparatus according to claim 1, including temperature regulating means connected to said nozzle bar for varying the temperature thereof in the vicinity of said second openings.

6. Apparatus according to claim 5, wherein said temperature regulating means includes portions positioned, on opposite sides of a row of said second openings.

7. Apparatus according to claim 6, wherein said temperature regulating means comprises a heating coil arranged in a U-shaped configuration on opposite sides of a row of said second openings.

8. Apparatus according to claim 1, wherein said outer cylindrical container is axially removable from said inner container, said cylindrical body of said inner container including a groove for receiving said nozzle bar, said groove being exposed upon removal of said outer cylindrical container.

9. Apparatus according to claim 1, wherein said nozzle bar is urged radially outwardly, under pressure of the material being flowed thereto, and into sealing engagement with said inner surface.

* * * * *